United States Patent [19]

Tanaka et al.

[11] Patent Number: 4,894,905

[45] Date of Patent: * Jan. 23, 1990

[54] METHOD OF FORMING ARMATURE CORE OF ELECTRIC ROTATING MACHINE

[75] Inventors: Toshinori Tanaka; Keiichi Konishi, both of Hyogoken, Japan

[73] Assignee: Mitsubishi Denki Kabushiki Kaisha, Tokyo, Japan

[*] Notice: The portion of the term of this patent subsequent to Jan. 23, 2007 has been disclaimed.

[21] Appl. No.: 212,428

[22] Filed: Jun. 28, 1988

Related U.S. Application Data

[63] Continuation-in-part of Ser. No. 166,718, Mar. 11, 1988.

[30] Foreign Application Priority Data

Mar. 12, 1987 [JP] Japan .................................. 62-59145

[51] Int. Cl.⁴ ............................................ H02K 15/02
[52] U.S. Cl. ...................................... 29/598; 29/605; 29/609; 72/142; 310/42; 310/217
[58] Field of Search ................ 29/596, 598, 605, 609; 72/142; 310/42, 217, 218

[56] References Cited

U.S. PATENT DOCUMENTS 3,225,424 12/1965 Wiley .................................... 29/605
4,116,033 9/1978 Iwaki et al. ........................... 72/142
4,206,621 6/1980 Kawasaki ............................. 72/130

FOREIGN PATENT DOCUMENTS 195450 11/1983 Japan .................................... 29/598

Primary Examiner—P.W. Echols
Attorney, Agent, or Firm—Wolf, Greenfield & Sacks

[57] ABSTRACT

A method of forming an armature core for an electric rotating machine is disclosed. The band-shaped metal sheet for forming a core sheet has a multiplicity of grooves formed along a longitudinal edge which defines the inner peripheral edge of a core sheet when the metal sheet is formed into an annular shape. The metal sheet is wound around a mandrel having projections thereon so that the grooves engage with the projections, respectively. Then, the grooves which open at the inner edge of the disk are deformed so as to be closed, for example, by ironing the inner peripheral edge of the disk. Thus, the inner surface of the core sheet for press-fitting an armature rotary shaft is formed into a continuous surface with no groove opening present therein. Accordingly, when the armature rotary shaft is press-fitted into the shaft, the core sheet contacts the shaft around the complete inner circumference of the bore, thus ensuring firm press-fitting of the shaft.

5 Claims, 5 Drawing Sheets

METHOD OF FORMING ARMATURE CORE OF ELECTRIC ROTATING MACHINE

RELATED APPLICATIONS

This application is a continuation-in-part of U.S. Ser. No. 166,718, filed Mar. 11, 1988, which corresponds to Japanese application No. 59145/1987, filed Mar. 12, 1987.

BACKGROUND OF THE INVENTION

1. Field of the Invention

The present invention relates to a method of forming an armature core of an electric rotating machine. More particularly, the present invention pertains to a method of forming a core sheet used for constituting an armature core.

2. Description of the Prior Art

The armature core of an electric rotating machine has heretofore been formed by one of two different processes. In one process, a multiplicity of separate core sheets are axially stacked. The construction of the typical prior art core sheet is illustrated in FIG. 6A. In accordance with another forming process, the cores of an electric rotating machine are formed by a spirally wound core sheet with an armature rotary shaft press-fitted thereto. Such a conventional spirally wound core sheet is depicted in the prior art drawing of FIG. 6B.

As shown in FIG. 6A, each core sheet 1 which is conventionally used for forming an armature core has the shape of an annular disk, and the radially outer portion of the core sheet 1 is provided with a multiplicity of armature coil winding slots 2 which extend radially inward, are circumferentially spaced at equal intervals and into which armature coils are to be set. The radially inner portion of the core sheet 1 is provided with a multiplicity of relatively long and narrow grooves 3 which extend radially outward. As will be clear from FIG. 6A, each armature coil winding slot 2 formed in the core sheet 1 generally has the shape of the letter "V" and its opening portion 2a is somewhat narrowed. In general, such core sheet 1 is formed of a band-shaped metal sheet 4 such as that shown in FIG. 5. The metal sheet 4 has notches 2' and 3' respectively formed along two longitudinal edges thereof, in advance, the notches 2' and 3' corresponding to the slots 2 and grooves 3 of the core sheet 1, respectively.

The band-shaped metal sheet 4 is formed into the annular disk-shaped core sheet 1 by a process of winding the sheet 4 around a mandrel 5 (see FIG. 2) with one turn. The notches 3' allow the sheet 4 to be bent with no difficulty because they get narrower as the sheet 4 is bent, and with a high degree of accuracy because they engage with projections 6, respectively, which are formed on the mandrel 5.

In the above-described conventional core sheet 1, the grooves 3 which have engaged with the projections 6 on the mandrel 5 remain as shown in FIG. 6A after the process is completed. Accordingly, when an armature rotary shaft (not shown) is press-fitted into the central bore of the core sheet 1 to thereby secure the core sheet 1 to the rotary shaft, such grooves 3 cause a reduction in the area of contact between the core sheet 1 and the armature rotary shaft, resulting in a reduction in the frictional force therebetween thereby inhibiting firm press-fitting of the armature rotary shaft into the central bore of the core sheet 1.

The second prior art embodiment is illustrated in FIG. 6B, showing the spirally wound core sheet 21. As shown in FIG. 6B, the radially outer portion of the core sheet 21 is provided with a multiplicity of armature coil winding slots 22, which extend radially inward, are circumferentially spaced at equal intervals and into which armature coils are to be set. The radially inner portion of the core sheet 21 is provided with a multiplicity of relatively long and narrow grooves 23 which extend radially outward. As will be clear from FIG. 6B, each armature coil winding slot 22 formed in the core sheet 21 generally has the shape of the letter "V" and its opening portion 22a is somewhat narrowed. In general, such a core sheet 21 is formed by a process of spirally winding a band-shaped metal sheet 24 such as that shown in FIG. 5. The metal sheet 4 depicted in FIG. 5 has notches 2' and 3' respectively formed along two longitudinal edges thereof, in advance, the notches 2' and 3' corresponding to the slots 22 and grooves 23 of the core sheet 21, respectively.

The band-shaped metal sheet 4 is formed into the spirally wound core sheet 21 by a process of spirally winding the sheet around a mandrel 5, as illustrated in dotted outline in FIG. 6B. The notches 3' allow the sheet 4 to be bent with no difficulty because they get narrower as the sheet 4 is bent, and with a high degree of accuracy because they engage with projections 6 (FIG. 2), respectively, which are formed on the mandrel 5.

In the above-described conventional core sheet 21, the grooves 23 which have engaged with projections 6 on the mandrel 5 remain as shown in FIG. 6B after the process is completed. Accordingly, when an armature rotary shaft (not shown) is press-fitted into the central bore of the core sheet 21 to thereby secure the core sheet 21 to the rotary shaft, such grooves 23 cause a reduction in the area of contact between the core sheet 21 and the armature rotary shaft, resulting in a reduction in the frictional force therebetween thereby inhibiting firm press-fitting of the armature rotary shaft into the central bore of the core sheet 21.

SUMMARY OF THE INVENTION

In view of the above-described problems of the prior art, it is a primary object of the present invention to provide a method of forming an armature core of an electric rotating machine in which the frictional force imposed between a core sheet and an armature rotary shaft is enough to ensure firm press-fitting of the shaft into the shaft receiving bore of the core sheet while the core sheet has grooves which facilitate the process wherein a band-shaped metal sheet is formed into the core sheet.

To this end, the present invention provides a method of forming an armature core of an electric rotating machine which is constructed of a core sheet means by the steps of:

providing a band-shaped metal sheet having two longitudinal edges, one of said edges corresponding to the outer circumference of said core sheet means and having a multiplicity of first notches formed therealong, and the other edge corresponding to the inner circumference of said core sheet means and having a multiplicity of second notches formed therealong;

winding said core sheet means around a mandrel having projections thereon so that said second notches engage with said projections; and closing said second notches at the inner circumference of said core sheet means to form the inner circumference into a continuity.

In accordance with one embodiment of the present invention, the method forms an armature core of an electric rotating machine constructed of a multiplicity of core sheets axially stacked. In accordance with an alternate embodiment of the present invention, there is formed an armature core of an electric rotating machine by spirally winding the core sheet means.

In the armature core formed by the method of the present invention, the core sheet means has a multiplicity of grooves formed along one longitudinal edge, which corresponds to the inner wall of a core sheet when the metal sheet is formed in a core member of an armature core and the core sheet means is wound around a mandrel having projections thereon so that the grooves respectively engage with the projections as the grooves narrow. After the core sheet means has been formed, the grooves remaining at the inner edge of the disk are closed, for example, by ironing the inner edge thereof. Thus, the inner surface of the central bore of the core sheet means for press-fitting an armature rotary shaft is formed continuously and has no remaining grooves. Accordingly, when the armature rotary shaft is press-fitted into the shaft, the core sheet contacts the shaft over the whole circumference of the inner surface of the bore.

In accordance with the present invention, the band-shaped metal sheet having the multiplicity of slots and grooves may be formed either into a separate core sheet capable of being axially stacked, or may be continuously spirally wound.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements and in which.

DESCRIPTION OF THE PREFERRED EMBODIMENT

Figure 1:
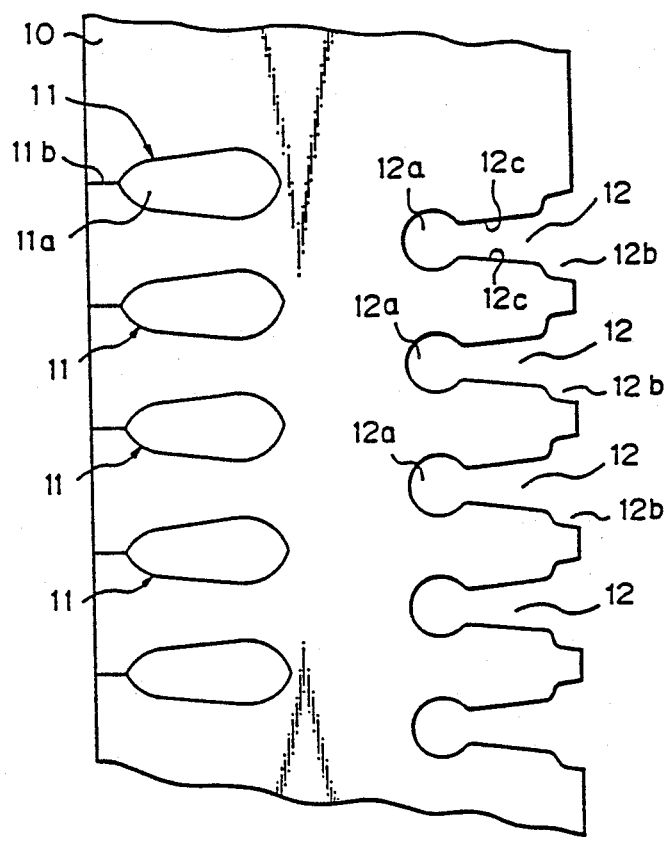
FIG. 1 is a fragmentary plan view of a part of a band-shaped metal sheet employed in the method of forming an armature core of an electric rotating machine according to the present invention.

The method of forming an armature of an electric rotating machine according to the present invention will be described hereinunder in more detail by way two separate embodiments and with reference to t accompanying drawings. In the following descriptic reference is made primarily to the embodiment of t invention in which the band-shaped metal sheet formed into separate core sheets. However, it is und stood that the principles of the present invention m also be employed in connection with the formation o continuous core sheet formed by the continuous spi winding of a band-shaped metal sheet.

The numeral 10 denotes a band-shaped metal sh which has two longitudinal edges respectively provid with a multiplicity of notches 11 and grooves 12 equal intervals. The notches 11 define armature c winding slots of the core sheet. Each notch 11 has eggplant-shaped space portion 11a extending latera and a cut line 11b laterally extending the space porti 11 and the corresponding longitudinal edge of the me sheet 10.

Figure 2:
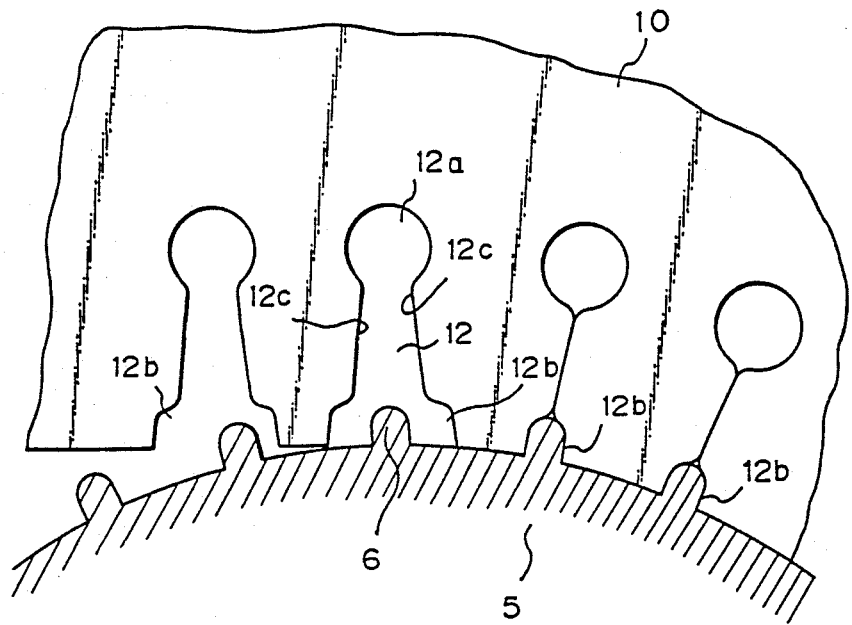
FIG. 2 is a fragmentary plan view of a part of the band-shaped metal sheet shown in FIG. 1, which shows the way in which the band-shaped metal sheet is formed either into a single annular disk-like shape by the use of a mandrel or a continuously spirally wound shape by the use of a mandrel.

Each groove 12 generally has a V-shaped configu tion and includes a circular portion 12a formed at t top thereof and an enlarged engagement portion 1 formed at the base thereof. The band-shaped me sheet 10 as described hereinbefore is wound arounc mandrel 5 having projections 6 thereon with one turn such a manner that the engagement portions 12b of t grooves 12 are matched with respective projections as shown in FIG. 2. As the band-shaped metal sheet is bent around the mandrel 5, the engagement portic 12b clamp the respective projections 6 since the groo 12 are narrow. The oblique sides 12c of each groove are finally brought into close contact with each othe On the other hand, the notches 11 are circumfere tially opened as the band-shaped metal sheet 10 is be into an annular disk-like shape. More specifically, t two edges defining the cut line 11b are circumfere tially separated from each other and the eggplar shaped space portion 11a is also spread circumfere tially. Since the increase in the width of the notches in the circumferential direction is greater at the radia outer side than at the radially inner side, when the me sheet 10 is formed into an annular disk 13 as shown FIG. 3, each notch 11 is formed into an armature c winding slot 14 of a core sheet 16 which has faci edges extending radially and parallel to each oth Then, the inner surface 13a of the annular disk is su jected to an ironing process, so that the engageme portions 12b that have engaged with the projections 6 the mandrel 5 are deformed and thereby closed. In t way, the inner surface 13a of the annular disk is form continuously and one core sheet 16 is thus complete In FIG. 3, the facing joining edge for an individual cc sheet is depicted at 12d.

A multiplicity of core sheets 16 thus formed are a ally stacked, and an armature rotary shaft is press-fitt into a central bore 15. Since the inner surface of ea core sheet 16 is continuous around the complete c cumference thereof, the core sheet 16 contacts the r tary shaft at all parts of the inner circumference of t central bore 15.

Since in the foregoing embodiment notches 11 are formed that, when the band-shaped metal sheet shaped into an annular disk, the notches have two f ing edges extending radially and parallel to each oth it is possible to effectively utilize the slot spaces partic larly when the armature core is used under low-volta and large-current conditions, such as the case of arn ture employed in a starting motor.

Figure 3:
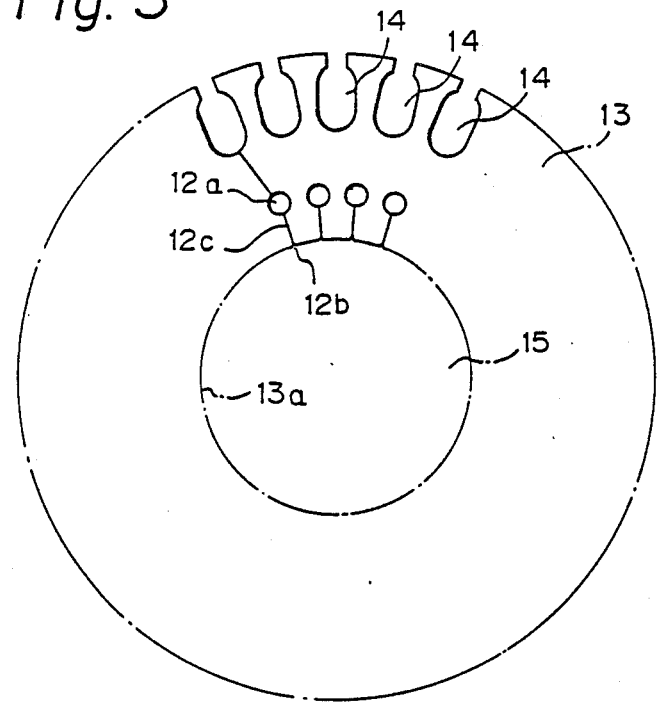
FIG. 3 is a plan view of a disk obtained by bending the band-shaped metal sheet.
Figure 4:
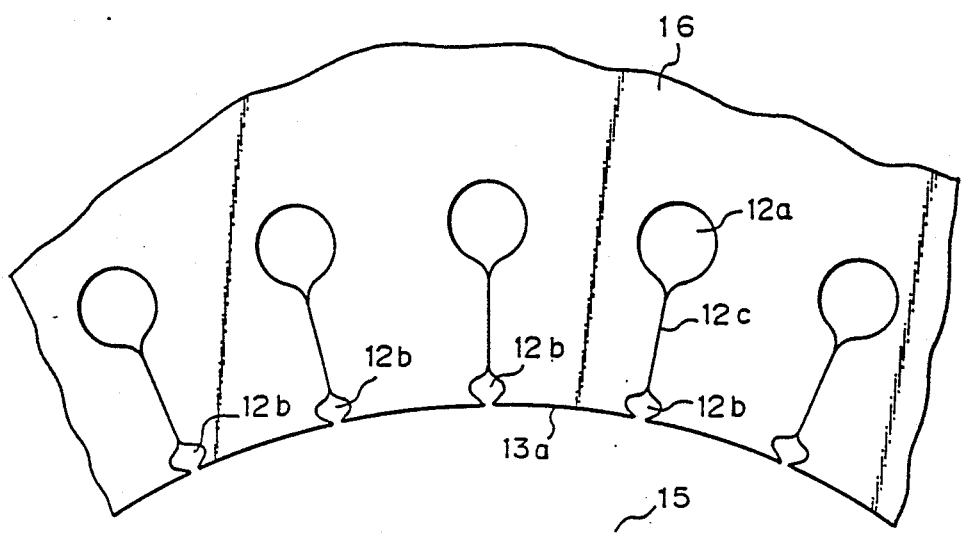
FIG. 4 is is a fragmentary plan view of a part of a wound metal sheet obtained by further working of the sheet.
Figure 5:
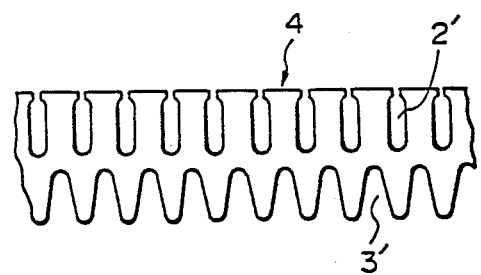
FIG. 5 is a fragmentary plan view of a part of a band-shaped metal sheet employed to form a conventional core sheet.
Figure 6A:
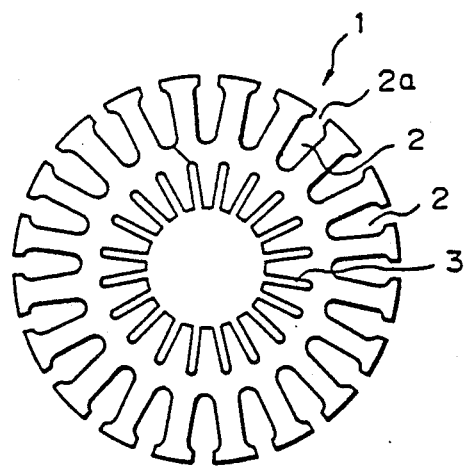
FIG. 6A is a plan view of a conventional core sheet.
Figure 6B:
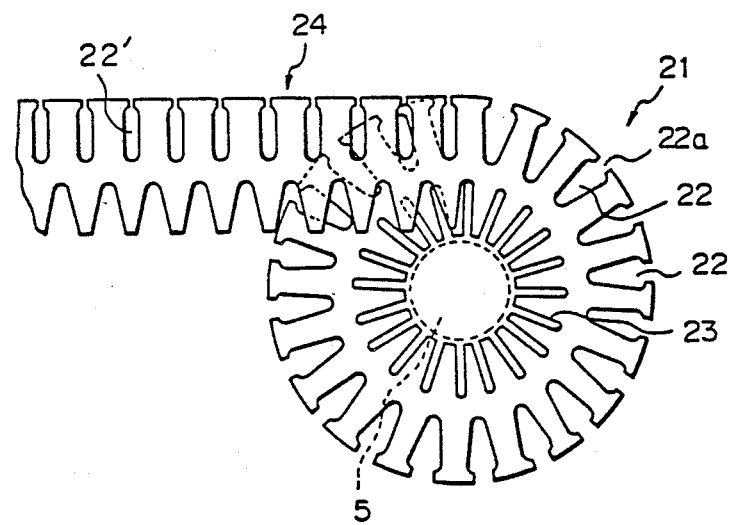
FIG. 6B is a plan view of a conventional spirally wound core sheet.

In an alternate embodiment of the present invention, instead of providing separate core sheets that are axially stacked, the present invention may also be employed in connection with providing a core member of an armature core obtained by spirally winding the band-metal sheet. The winding may be carried out in association with a mandrel such as in the general manner described in FIG. 6B herein. The general configuration in the spiral wound embodiment would be substantially as illustrated in FIGS. 3 and 4 herein.

Thus, the armature core formed according to the method of the present invention has an inner surface which is continuous around the complete circumference thereof, so that, when an armature rotary shaft is press-fitted into the central bore, the inner surface of the bore contacts the shaft at all parts of the circumference. Accordingly, it is possible to increase the frictional force between the core sheet and the armature rotary shaft and to thereby ensure firm press-fitting of the shaft into the shaft receiving bore in the core sheet.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. A method of forming an armature core of an electric rotating machine, said method including the steps of:
    forming a core sheet means having an annular shape by spiral winding;
    said method characterized in that said step of forming a core sheet means comprises the steps of:
    providing a band-shaped metal sheet having two longitudinal edges, one of said edges corresponding to the outer circumference of said annular shape and having a multiplicity of first notches formed therealong, and the other edge corresponding to the inner circumference of said annular shape and having a multiplicity of second notches formed therealong;
    spirally winding said band-shaped metal sheet around a mandrel having projections thereon so that said second notches engage with said projections to form said annular shape; and
    closing said second notches at least at the inner circumference of said annular shape to form the inner circumference into a continuity.

2. A method of forming an armature core as claimed in claim 1, wherein said first notches are so formed that, when said band-shaped metal sheet is formed into said annular shape, each said first notch has two facing edges extending radially and parallel to each other.

3. A method of forming an armature core as claimed in claim 1, wherein said second notches have oblique sides with converging and diverging ends, said converging ends forming a circular portion, said diverging ends forming an enlarged engagement portion, said oblique sides being brought into contact with each other when said band-shaped metal sheet is formed into said annular shape.

4. A method of forming an armature core as claimed in claim 1, wherein said first notches are so formed that, when said band-shaped metal sheet is formed into said annular shape each said first notch has two facing edges extending radially and parallel to each other, and said second notches have oblique sides with converging and diverging ends, said converging ends forming a circular portion, said diverging ends forming an enlarged engagement portion, said oblique sides being brought into contact with each other when said band-shaped metal sheet is formed into said annular shape.

5. A method of forming an armature core as claimed in claim 4 wherein the step of closing said second notches includes ironing the inner surface of the helical shape so that the enlarged engagement portions are deformed and thereby closed.

* * * * *